United States Patent [19]

Papay

[11] Patent Number: 5,256,324
[45] Date of Patent: * Oct. 26, 1993

[54] MODIFIED SUCCINIMIDE OR SUCCINAMIDE DISPERSANTS AND THEIR PRODUCTION

[75] Inventor: Andrew G. Papay, Manchester, Mo.

[73] Assignee: Ethyl Petroleum Additives, Inc., Richmond, Va.

[*] Notice: The portion of the term of this patent subsequent to Mar. 30, 2010 has been disclaimed.

[21] Appl. No.: 766,127

[22] Filed: Sep. 27, 1991

Related U.S. Application Data

[60] Division of Ser. No. 601,240, Oct. 22, 1990, abandoned, and Ser. No. 313,021, Feb. 21, 1989, Pat. No. 5,164,103, said Ser. No. 313,021, is a continuation-in-part of Ser. No. 167,875, Mar. 14, 1988, Pat. No. 4,855,074.

[51] Int. Cl.$^5$ ............... C10M 155/00; C10M 153/00
[52] U.S. Cl. .................................. 252/49.9; 252/78.5; 548/520; 548/546; 548/547; 558/72
[58] Field of Search ............... 252/49.9; 548/545, 520, 548/546; 558/72

[56] References Cited

U.S. PATENT DOCUMENTS

| | | | |
|---|---|---|---|
| 4,338,205 | 7/1982 | Wisotsky | 252/49.9 |
| 4,857,214 | 8/1989 | Papay et al. | 548/545 |
| 5,089,156 | 2/1992 | Chrisope et al. | 252/49.9 |

Primary Examiner—Ellen M. McAvoy
Attorney, Agent, or Firm—John F. Sieberth

[57] ABSTRACT

Preconditioned automatic transmission fluids are made by using a preblend formed by heating an alkenyl succinimide or succinamide dispersant with a phosphorus ester and water to partially hydrolyze the ester and then mixing the preblend and other additives with a base oil.

44 Claims, No Drawings

MODIFIED SUCCINIMIDE OR SUCCINAMIDE DISPERSANTS AND THEIR PRODUCTION

RELATED APPLICATION

This application is a division of copending Applications Ser. No. 601,240, filed Oct. 22, 1990, now abandoned and Application Ser. No. 313,021 filed Feb. 21, 1989, now U.S. Pat. No. 5,164,103. Application Ser. No. 313,021 is a continuation-in-part of Application Ser. No. 167,875, filed Mar. 14, 1988, now U.S. Pat. No. 4,855,074.

BACKGROUND OF THE INVENTION

This invention relates generally to the preparation of functional fluids and more specifically to a process for preparing phosphorus ester anti-wear agent containing automatic transmission fluids (ATF) having a reduced break-in period.

Esters of phosphorus acids are used in lubricants to impart anti-wear properties. I have found that in functional fluid applications, such as automatic transmission fluids (ATF), where the esters are used in oil blends containing ashless dispersants of the alkenyl succinimide-succinamide type, the fluids must undergo an extended break-in period before they provide stable dynamic and static torque characteristics.

BRIEF SUMMARY OF THE INVENTION

I have now found that the break-in period of the ATF can be significantly reduced by preblending a phosphorus ester and an alkenyl succinimide or succinamide ashless dispersant and heating the blend in the presence of water to partially hydrolyze the ester.

In accordance with this invention, there is provided a process for preparing a preconditioned automatic transmission fluid which comprises:

A. forming a preblend by (i) heating a mixture of a long chain aliphatic succinimide or succinamide dispersant, in which the chain has a number average molecular weight in the range of about 700 to 5,000, and a phosphorus acid ester, in proportions of from about 2 to 200 parts by weight of dispersant per part by weight of ester, in the presence of at least about 0.01 part by weight water per part by weight of ester, at a temperature in the range of from about 50° C. to 150° C. for a time sufficient to partially hydrolyze the phosphorus acid ester, and (ii) removing water and alcohol from the mixture, and B. mixing the preblend with a major portion of an oil to form a blended lubricant having a viscosity of from about 6.5 to 8.5 cSt (100° C).

Also provided are preblends and lubricant compositions formed using the process of the invention.

DETAILED DESCRIPTION

The phosphorus esters used in the process of this invention can include both dihydrocarbylphosphites and phosphonate esters.

Dihydrocarbylphosphites usable in the process of this invention include dialkylphosphites, dicycloalkylphosphites, diarylphosphites, diaralkylphosphites, monoalkylmonoarylphosphites, and the like wherein the ester portions are usually derived from hydrocarbon radicals having from about 1 to 30 carbon atoms and preferably 1-20 carbon atoms. Illustrative compounds of this type include dimethylphosphite, diethylphosphite, dibutylphosphite, dioctylphosphite, dicyclohexylphosphite, diphenylphosphite, diallylphosphite, dibenzylphosphite, phenylneopentylphosphite, and the like.

Phosphonate esters which may be employed in accordance with this invention are dihydrocarbyl esters of a hydrocarbylphosphonic acid, which compounds may be represented by the formula $R-PO(OR)_2$ in which the R groups may be the same or different hydrocarbyl groups which usually contain from about 1 to 30 carbon atoms and preferably 1-20 carbon atoms. Illustrative compounds of this type include: dimethyl octadecane phosphonate, dimethyl octadecene phosphonate, diethyl dodecane phosphonate, dibutyl tetradecane phosphonate, dioctyl butane phosphonate, dihexyl benzene phosphonate, diphenyl 2-ethylhexane phosphonate, diallyl cyclohexane phosphonate, and the like.

Sulfur analogs of the phosphorus esters such as alkyl esters of dithiophosphoric acid can also be used.

The above types of esters and their preparation are well known in the art.

The process of this invention can utilize any long chain aliphatic succinimide or succinamide dispersant in which the number average molecular weight of the long chain hydrocarbyl group is in the range of 700 to 5,000, and preferably in the range of 900 to 2,100. The nature and methods for the production of such compounds are well known to those skilled in the art. See for example, U.S. Pat. No. 3,087,936, 3,178,892, 3,202,678, 3,219,666, 3,272,746, 3,254,025, 3,338,832, and 4,388,201, the disclosures of which are incorporated herein by reference. Preferred succinimides are alkyl or alkenyl succinimides of alkylene polyamines, especially mixtures including triethylene tetramine and/or tetraethylene pentamine in which the alkyl or alkenyl group has a number average molecular weight in the range of 900 to 1,800.

Generally from about 2 to 200 parts by weight of dispersant are used per part by weight of phosphorus ester.

Since water used or formed in the process is distilled off, the maximum amount of water that may be added to the initial mixture is not critical. A feature of this invention, however, is the fact that the amount of water used can be extremely small and the succinimide may contain sufficient moisture to initiate the partial hydrolysis of the phosphorus ester but the reaction time is longer than when using added water. Thus the amount of water distilled off can likewise be kept to a minimum and thus energy requirements for the process can be kept to a minimum.

When using added water, the initial mixture will contain at least about 0.01 part, and preferably about 0.1 part, by weight of water per part by weight of phosphorus ester.

The partially hydrolyzed phosphorus ester is believed to react with the amine portion of the succinimide and/or succinamide dispersant, during the formation of the preblend.

Advantageously other additives such as are useful in forming ATF or other functional fluids can be added to the preblend, especially one or more of a boronating agent, a benzotriazole an aromatic seal swelling agent, and an alkoxylated amine, so long as they do not interfere with the partial hydrolysis and reaction of the phosphorus ester with the dispersant.

Boronating agents are preferably selected from an ester of an oxyacid of boron, such as a borate ester, a pyroborate ester, a metaborate ester or the like; and most preferably boric acid. This not only forms a compatible additive concentrate, but the long chain succinimide is boronated in the process. Water formed when using boric acid or partial esters of oxyacids of boron in the boronation process together with any water initially added to the system is distilled off. Besides boric acid examples of specific boronating agents include trimethyl borate, triethyl borate, tripropyl borate, tributyl borate, triphenyl borate, tribenzyl borate, dimethyl borate, monobutyl borate, monophenyl borate, and the like, as well as similar esters of metaboric acid, pyroboric acid.

The alkoxylated amines which may be utilized in the practice of this invention are preferably primary aliphatic amines that have been ethoxylated or propoxylated. The resultant product is thus an N,N-bis(hydroxyalkyl)-N-aliphatic amine in which the aliphatic group is preferably an alkyl or alkenyl group containing from 10 to 22 carbon atoms, most preferably an alkyl or alkenyl group containing from 16 to 18 carbon atoms. N,N-bis(hydroxyethyl)-N-tallow amine is especially preferred.

A benzotriazole such as tolutriazole can be added to the preblend and also as seal swelling agents mixed aromatic hydrocarbons such as naphthalene and alkylated naphthalenes especially methyl naphthalene.

Suitable triazoles include benzotriazole and alkyl-substituted benzotriazoles preferably having 1 or 2 alkyl groups containing 1 to 10 carbon atoms, most preferably 1 carbon atom. Benzotriazole is available under the trade designation Cobratec 99 from Sherwin-Williams Chemical Company. A particularly suitable alkyl-substituted benzotriazole is tolyltriazole which is available from Sherwin-Williams Chemical under the trade designation Cobratec TT-100.

While the proportions of the various ingredients can be varied, they will generally range in parts by weight, as follows:

Long Chain Succinimide: 0.1 to 10; preferably 2.5 to 3.5;
Phosphorus ester: 0.05 to 1.0; preferably, 0.1 to 0.3;
Water: 0.01 to 0.1; preferably 0.01 to 0.03;
Boronating agent (optional): 0.01 to 0.3; preferably 0.05 to 0.15;
Benzotriazole (optional): 0.01 to 0.1; preferably 0.03 to 0.05;
Alkoxylated amine (optional): 0.01 to 1; preferably 0.1 to 0.2;
Aromatic seal swelling agent (optional): 0.05 to 2.0; preferably 0.2 to 0.6.

If desired a small amount of a diluent oil (e.g., up to about 1 part per part by weight of the succinimide and/or succinamide component) may be included in the mixture being heated.

The preblend is formed by mixing the ingredients in a suitable vessel and heating with agitation for a sufficient time usually from about 0.5 to 3.0 hours at temperatures of at least about 50° C. and usually in the range of about 80° to 150° C. (preferred 100° to 120° C.) to partially hydrolyze the phosphorus acid ester. The volatile reaction products, mainly water and lower boiling alcohols, resulting from the hydrolysis are distilled from the reaction mixture to provide the preblend which is then combined with any additional additives and a major portion (usually 85 to 95 weight percent of total composition) of base oil required to form a blended lubricant.

It will be understood and appreciated that the heating and distillation steps need not be performed separately. Instead the mixture of the desired components can be heated while water is being distilled off. Optimum conditions for use with any given mixture of components can be readily ascertained by the simple expedient of running a few pilot experiments. It will be noted that the entire operation can be performed in the same vessel equipped with heating, stirring and distillation means. It is not necessary to employ distillation columns or the like as the water can be boiled off as steam while leaving the other (higher boiling) materials in the heating vessel.

Base oils suitable for use in forming automatic transmission fluids are known in the art and include refined mineral oils and synthetic oils, such as liquid 2-olefin polymers, having viscosities of from about 3.5 to 4.5 cSt at 100° C. and preferably from about 3.8 to 4.4 cSt at 100° C., for example 100 neutral oil or blends of 80–120 neutral oils.

Other typical ATF additives include (1) metal protectants such as thiadiazole derivatives (2) friction modifiers and antiwear agents such as sulfurized fatty esters, long chain amides and long chain amines (3) antioxidants such as dialkyl diphenylamines, hindered phenols, such as bis-o-t-butyl phenols and sulfur bridged phenolic derivatives (4) seal swelling agents such as aromatic hydrocarbons and aromatic sulfones (5) defoamants such as polydimethyl silicones and/or polyethyl-octyl acrylates (6) viscosity index improvers such as polymethacrylate, or ethylene-propylene copolymers (7) detergents such as neutral and overbased alkyl benzene sulfonic acid or phenolic salts, and (8) pour point depressants.

The preblend and other additives are usually combined, sometimes including a small amount of process oil, to form a concentrate which is then blended with the base lubricant oil to form the finished fluid. The finished transmission fluids are formulated to have viscosities suitable for such use and are in the range of 6.5 to 8.5 cSt (preferred 6.5 to 7.5) at 100° C. and a maximum viscosity of about 50,000 centipoises at −40° C.

The practice and advantages of this invention are further illustrated by the following examples. The long chain succinimide dispersant used in these illustrative examples was an monoalkenyl succinimide derived from a commercial mixture of alkylene polyamines. The succinimide was formed by reacting an approximately equimolar mixture of maleic anhydride and polyisobutylene having a number average molecular weight of approximately 980 and then reacting this product with a mixture of alkylene polyamines predominating in triethylene tetramine and tetraethylene pentamine, using about 0.5 mole of the amines per mole of polyisobutylene employed. Products of this general type but made with different stoichiometry in the second step are described for example in U.S. Pat. No. 3,202,678.

EXAMPLE 1

Into a reaction vessel equipped with heating and stirring means were charged 9,894 grams of the above long chain succinimide dispersant, 1,008.8 grams of dibutylphosphite, 116.4 grams of water and also 135.8 grams of tolyltriazole, 388 grams of boric acid and 1,940 grams of mixed aromatic hydrocarbons, mainly methylnaphthalene. The mixture was heated at about 100° C. for about 3 hours and the volatile materials, including water and the butanol formed by partial hydrolysis of the phosphite ester, were then removed by distillation under vacuum (40mm Hg). The distillate weighed 393 grams and contained by volume about 290 ml butanol, 10 ml unidentified emulsion and 135 ml water.

A fully blended transmission fluid was made using about a 2,088 gram portion of the preblend (about 3.3% by weight of total fluid) in about a 56,835 gram portion of Exxon 1365 base oil (about 90.2% by weight of total fluid) with the remaining 6.5% by weight being other additives as discussed above including, 0.06% silicon antifoam agent, 0.5% aromatic seal swelling agent, 0.73% process oil, 3.4% acrylate VI improver, 0.8% sulfurized fat antiwear, 0.04 thiadiazole metal deactivator, 0.16% alkoxylated amine, 0.28% arylamine antioxidant, 0.2% imide friction reducer, 0.02% red dye, 0.15% pour point depressant, 0.05% detergent, 0.05% surfactant and 0.03% acrylate antifoam.

A portion of the blended fluid was tested according to the General Motors Standard High Energy Friction Characteristics and Durability Test Procedure (HEFCAD). The dynamic and static torque (ST) levels in Newton meters over time are listed in Table 1 below.

TABLE I

| Time | Example 1 | | Comparison | |
|---|---|---|---|---|
| (Hours) | ST | DT | ST | DT |
| 0 | 109 | 117 | 133 | 121 |
| ½ | 113 | 123 | 138 | 130 |
| 1 | 116 | 130 | 130 | 129 |
| 1½ | 116 | 133 | 128 | 128 |
| 2 | 117 | 135 | 128 | 128 |
| 3 | 117 | 135 | 130 | 128 |
| 4 | 117 | 135 | 129 | 129 |
| 5 | 117 | 135 | 130 | 133 |
| 6 | 118 | 135 | 134 | 137 |
| 8 | 119 | 134 | 139 | 141 |
| 10 | 119 | 134 | 139 | 142 |
| 16 | 120 | 136 | 141 | 142 |
| 20 | 121 | 137 | 141 | 142 |

It can be seen from the torque data that the blend of Example 1 achieved break-in after about 2 hours, i.e. the torque levels became relatively constant over time.

A fully formulated fluid not exactly identical to that of Example 1, but suitable for comparison of break-in characteristics, was prepared using 3.8% by weight of a preblend formed by heating 11,200 grams of the succinimide, 105 grams of water, 140 grams of tolyltriazole, 1750 grams of mixed aromatic hydrocarbons and 350 grams of boric acid, i.e. without any dibutylphosphite. The fully blended transmission fluid was then made which contained 0.26% by weight of unhydrolyzed dibutyl phosphite mixed with 90.7% by weight of Exxon 1365 base oil and the preblend along with the other additives. The HEFCAD results for this comparison fluid are given in Table I. It can be seen from the torque data that break-in of the fluid, i.e. achieving relatively constant static and dynamic torque values, took about 8 hours which was found to be typical of fluids where the phosphorus ester was not added to the preblend. This long break-in was not reduced even when the total additive blend was heated to 100° C. for 2 hours before mixing with the base oil. Accordingly, it is essential to heat the phosphite in the presence of dispersant in the preblend in order to achieve the benefit of the invention.

EXAMPLE 2

A preblend containing partially hydrolyzed dibutyl phosphite was formed by charging the reaction vessel with 255 grams of the succinimide dispersant, 10 grams of boric acid crystals, 3.5 grams of tolytriazole, 25 grams of dibutylphosphite, and 16 grams of N,N-bis(hydroxyethyl)-N-tallow amine (ETHOMEEN T-12). The mixture was heated at 100° C. for 3 hours at which point the boric acid had all dissolved in the mixture. Then a vacuum of no more than 40mm of mercury was applied to distill off the water and butyl alcohol formed in the reaction. The temperature was gradually raised to 110° C. to distill off the last quantity of distillate. The desired product mixture left in the reaction vessel remained homogeneous after cooling to room temperature.

The above product mixture is useful in forming concentrates and fully formulated transmission fluids having reduced break-in times.

This invention is susceptible to considerable variation in its practice within the spirit and scope of the appended claims.

I claim:

1. A process which comprises heating a succinimide or succinamide dispersant with (i) a mixture comprising at least 0.4 part by weight of a water-hydrolyzable phosphorus ester per part by weight of said dispersant and at least 0.1 part by weight of water per part by weight of said ester, and (ii) a boron compound and removing water such that a phosphorus- and boron-containing succinimide or succinamide is formed.

2. A process as claimed in claim 1 wherein said dispersant consists essentially of a long chain aliphatic succinimide or succinamide in which the chain has a number average molecular weight of at least 700.

3. A process as claimed in claim 2 wherein said phosphorus ester is a dihydrocarbyl phosphite.

4. A process as claimed in claim 1 wherein said dispersant consists essentially of a long chain aliphatic succinimide of an alkylene polyamine in which the aliphatic group has a number average molecular weight in the range of 900 to 2,100.

5. A process as claimed in claim 4 wherein said phosphorus ester is a dihydrocarbyl phosphite.

6. A process as claimed in claim 1 wherein said dispersant consists essentially of a long chain alkyl or alkenyl succinimide of an alkylene polyamine derived from a mixture of amines selected from triethylene tetramine and tetraethylene pentamine.

7. A process as claimed in claim 6 wherein said phosphorus ester is a dihydrocarbyl phosphite.

8. A process of preparing a phosphorus- and boron-containing succinimide or succinamide, which process comprises heating a blend comprising a succinimide or succinamide dispersant, at least 0.04 part by weight of a water-hydrolyzable phosphorus ester per part by weight of said dispersant, at least 0.1 part by weight of water per part by weight of said ester, and a boron compound at a temperature and for a time sufficient to partially hydrolyze said phosphorus ester and form an alcohol; and separating water and an alcohol from the reaction mixture whereby a phosphorus- and boron-containing succinimide or succinamide composition remains.

9. A process as claimed in claim 8 wherein said dispersant consists essentially of a long chain aliphatic succinimide or succinamide in which the chain has a number average molecular weight of at least about 700 and wherein said temperature is in the range of from about 50° C. to 150° C.

10. A process as claimed in claim 9 wherein the separation of water and hydrocarbyl alcohol from the reaction mixture is effected by distillation.

11. A process as claimed in claim 9 wherein said water-hydrolyzable phosphorus ester consists essentially of a dihydrocarbyl phosphite.

12. A process as claimed in claim 11 wherein said boron compound consists essentially of boric acid.

13. A process of preparing a phosphorus- and boron-containing succinimide or succinamide, which process comprises heating a blend comprising a succinimide or succinamide dispersant, at least 0.04 part by weight of a dihydrocarbyl phosphite per part by weight of said dispersant, at least 0.1 part by weight of water per part by weight of said phosphite, and a boron compound at a temperature in the range of about 80° to 150° C.; and distilling water and an alcohol from the reaction mixture whereby a phosphorus- and boron-containing succinimide or succinamide composition remains.

14. A process as claimed in claim 13 wherein said dispersant consists essentially of a long chain alkyl or alkenyl succinimide of an alkylene polyamine in which the alkyl or alkenyl group has a number average molecular weight in the range of about 900 to 2,100.

15. A process as claimed in claim 13 wherein said distillation is conducted under a vacuum.

16. A process as claimed in claim 13 wherein said boron compound consists essentially of boric acid.

17. A process as claimed in claim 13 wherein said dispersant consists essentially of a long chain alkyl or alkenyl succinimide of an alkylene polyamine in which the alkyl or alkenyl group has a number average molecular weight in the range of about 900 to 2,100, wherein said boron compound consists essentially of boric acid, and wherein said distillation is conducted under a vacuum.

18. A process as claimed in claim 13 wherein said dispersant consists essentially of a long chain alkyl or alkenyl succinimide of an alkylene polyamine derived from a mixture of amines selected from triethylene tetramine and tetraethylene pentamine.

19. A process as claimed in claim 13 wherein said dispersant consists essentially of a long chain alkyl or alkenyl succinimide of an alkylene polyamine derived from a mixture of amines selected from triethylene tetramine and tetraethylene pentamine, wherein said boron compound consists essentially of boric acid, and wherein said distillation is conducted under a vacuum.

20. A composition formed by a process which comprises heating a succinimide or succinamide dispersant with (i) a mixture comprising at least 0.04 part by weight of a water-hydrolyzable phosphorus ester per part by weight of said dispersant and at least 0.1 part by weight of water per part by weight of said ester, and (ii) a boron compound and removing water such that a phosphorus- and boron-containing succinimide or succinamide is formed.

21. A composition as claimed in claim 20 wherein formed using a dispersant which consists essentially of a long chain aliphatic succinimide or succinamide in which the chain has a number average molecular weight of at least 700.

22. A composition as claimed in claim 20 when formed using a dispersant which consists essentially of a long chain alkyl or alkenyl succinimide of an alkylene polyamine derived from a mixture of amines selected from triethylene tetramine and tetraethylene pentamine.

23. A composition formed by a process which comprises heating a mixture comprising a succinimide or succinamide dispersant, at least 0.04 part by weight of a dihydrocarbyl phosphite per part by weight of said dispersant, at least 0.1 part by weight of water per part by weight of said phosphite, and a boron compound at a temperature in the range of about 80° C. to 150° C.; and distilling water and an alcohol from the reaction mixture.

24. A composition as claimed in claim 23 wherein said composition comprises a phosphorus- and boron-containing succinimide or succinamide dispersant composition which remains homogeneous after cooling to room temperature.

25. A composition as claimed in claim 23 when formed using a dispersant which consists essentially of a long chain alkyl or alkenyl succinimide of an alkylene polyamine in which the alkyl or alkenyl group has a number average molecular weight in the range of about 900 to 2,100.

26. A composition as claimed in claim 23 when formed using as said dispersant a long chain alkyl or alkenyl succinimide of an alkylene polyamine in which the alkyl or alkenyl group has a number average molecular weight in the range of about 900 to 2,100, when using boric acid as said boron compound, and when conducting the distillation under a vacuum, said composition comprising a phosphorus- and boron-containing succinimide dispersant composition which remains homogeneous after cooling to room temperature.

27. A composition as claimed in claim 23 when formed using a dispersant which consists essentially of a long chain alkyl or alkenyl succinimide of an alkylene polyamine derived from a mixture of amines selected from triethylene tetramine and tetraethylene pentamine.

28. A composition as claimed in claim 23 when formed using a dispersant which consists essentially of a long chain alkyl or alkenyl succinimide of an alkylene polyamine derived from a mixture of amines selected from triethylene tetramine and tetraethylene pentamine, when using boric acid as said boron compound, and when conducting the distillation under a vacuum, said composition comprising a phosphorus- and boron-containing succinimide dispersant composition which remains homogeneous after cooling to room temperature.

29. A process which comprises forming a mixture comprising a long chain aliphatic succinimide dispersant, a boronating agent, at least 0.04 part by weight of a dihydrocarbyl phosphite per part by weight of said dispersant and at least 0.1 part by weight of water per part by weight of said phosphite, heating the mixture and distilling off water to produce a product mixture that remains homogeneous after cooling to room temperature.

30. A process according to claim 29 wherein the heating and distillation are performed separately.

31. A process according to claim 29 wherein the heating and distillation are performed together.

32. A process according to claim 29 wherein the entire operation is performed in the same vessel.

33. A process according to claim 29 wherein the boronating agent is boric acid.

34. A process according to claim 29 wherein the mixture is heated at 100° C. to 120° C.

35. A process according to claim 29 wherein the mixture additionally contains a small amount of diluent oil.

36. A process according to claim 29 wherein the number average molecular weight of the long chain hydrocarbyl group of the succinimide dispersant is in the range of 900 to 2100.

37. A process according to claim 36 wherein the boronating agent is boric acid.

38. A process according to claim 37 wherein the mixture is heated at 100° C. to 120° C.

39. A process according to claim 37 wherein the heating and distillation are performed separately.

40. A product formed by the process of claim 29.
41. A product formed by the process of claim 33.
42. A product formed by the process of claim 34.
43. A product formed by the process of claim 35.
44. A product formed by the process of claim 36.

* * * * *